(12) United States Patent
Soles et al.

(10) Patent No.: US 6,425,595 B1
(45) Date of Patent: Jul. 30, 2002

(54) AUTOMOTIVE SUSPENSION SYSTEM INCORPORATING SPLAY REDUCTION DEVICE

(75) Inventors: Peter J. Soles, Tecumseh (CA); Frank Nick Casali, Shelby Township, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/688,236

(22) Filed: Oct. 16, 2000

(51) Int. Cl.[7] .......................... B60G 11/02; B60G 11/04
(52) U.S. Cl. .......................... 280/124.175; 280/124.17; 280/124.174; 267/53
(58) Field of Search .................. 267/229, 230, 267/246, 158, 36.1, 37.1, 37.2, 37.3, 51, 52, 53, 191, 193; 280/124.175, 124.17, 124.174

(56) References Cited

U.S. PATENT DOCUMENTS

| | | | | |
|---|---|---|---|---|
| 1,167,513 A | * | 1/1916 | Oliver | 267/53 |
| 1,189,590 A | * | 7/1916 | Loomis | 267/52 |
| 1,385,872 A | * | 7/1921 | Hood | 267/48 |
| 1,418,580 A | * | 6/1922 | Kronewitter | 267/53 |
| 1,419,083 A | * | 6/1922 | Sturt | 267/53 |
| 1,606,665 A | * | 11/1926 | Rayl | 267/49 |
| 1,631,222 A | * | 6/1927 | Root | 267/53 |
| 1,772,380 A | * | 8/1930 | Allen | 267/53 |
| 1,860,656 A | * | 5/1932 | Crabtree | 267/53 |
| 1,867,203 A | * | 7/1932 | Blackmore et al. | 267/53 |
| 1,893,229 A | * | 1/1933 | Crabtree | 267/53 |
| 1,970,765 A | * | 8/1934 | Parkhill | 267/53 |
| 4,227,716 A | * | 10/1980 | Nordstrom | 267/52 |
| 4,519,589 A | * | 5/1985 | Skynar | 267/52 |
| 4,895,350 A | * | 1/1990 | Schoof et al. | 267/52 |

FOREIGN PATENT DOCUMENTS

| | | | |
|---|---|---|---|
| JP | 57160705 A | * | 10/1982 |
| JP | 581333906 A | * | 8/1983 |
| JP | 60101333 A | * | 6/1985 |
| JP | 10024719 A | * | 1/1998 |

* cited by examiner

*Primary Examiner*—Lanna Mai
*Assistant Examiner*—Ruth Ilan
(74) *Attorney, Agent, or Firm*—Laura C. Hargitt

(57) ABSTRACT

Automotive suspension system having a leaf spring assembly. A splay reduction device is employed for maintaining alignment of leaf members.

12 Claims, 3 Drawing Sheets

AUTOMOTIVE SUSPENSION SYSTEM INCORPORATING SPLAY REDUCTION DEVICE

TECHNICAL FIELD

The present invention relates to automotive vehicle suspension systems, and more particularly to a vehicle leaf spring suspension system having reduced splay characteristics.

BACKGROUND OF THE INVENTION

Certain automotive vehicle suspension systems, particularly those employing auxiliary leaf springs, sometimes may be prone to splaying. That is, individual leaves may rotate relative to one another. It has become increasingly popular to tune vehicle suspensions for improved vehicle handling. One way to accomplish this is by controlling the amount of splay exhibited by the leaves.

In view of recent engineering advancements in vehicle structure and assembly technology, it is now desirable to provide a leaf spring suspension system exhibiting reduced splay through employment of structure that avoids substantial interference with the spring auxiliary stop brackets and the frame turnover hole, without substantially increasing the stress carried by the structure, and without lengthening the leaves of the springs.

Particularly, in one type of suspension, employing an auxiliary leaf spring assembly, to help manage the increased load associated with the mounting of auxiliary springs and splay reduction clips, there is a particular need to locate the attachment of anti-splay clips away from the clasping feature and the center of the auxiliary spring assembly, while avoiding interfering contact with other vehicle components.

SUMMARY OF THE INVENTION

The devices and assemblies of the present invention are premised upon the discovery of a unique device for reducing splay in a vehicle leaf spring suspension system. In general, the device includes a first generally planar portion having a first side, a second side and a free end; and a second portion for receiving and substantially surrounding a plurality of resilient stacked leaf members.

The present invention thereby meets the needs identified above by providing an improved splay reduction system for automotive vehicle leaf spring assemblies. The system helps to prevent leaves from splaying while maintaining a low stress area for the spring and attractive clearance with the spring stop brackets. Moreover, the present system employs a splay reduction device that allows the mounting and clasping features to be located in different areas of the spring, further facilitating the mounting in certain packaging clearance areas while still maintaining low spring stress. Use of the elegantly simplified system of the present invention promises to ultimately reduce overall vehicle manufacture cost and assembly mass.

DETAILED DESCRIPTIONS OF THE PREFERRED EMBODIMENT

Figure 1:
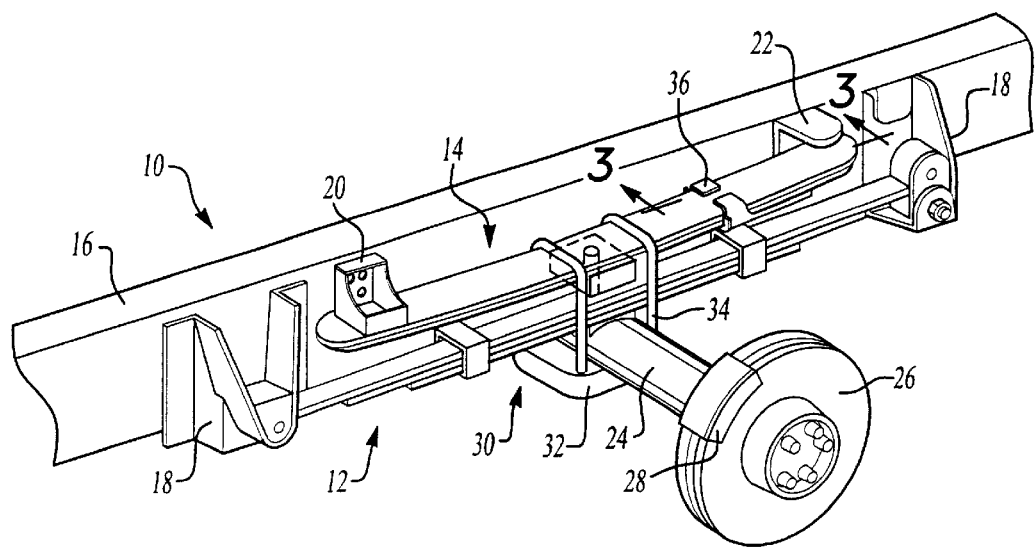
FIG. 1 is a perspective drawing of one preferred embodiment installed on a typical vehicle suspension assembly.

Referring to FIG. 1, there is shown a portion of a suspension assembly 10 of an automotive vehicle, and more specifically a truck. The suspension assembly includes a first suspension assembly, such as a first leaf spring assembly 12 and a second suspension assembly or auxiliary leaf spring assembly 14. Both leaf springs assemblies include a plurality of stacked resilient elongated leaf members oriented with their longitudinal axes generally parallel with the longitudinal axis of the vehicle.

Figure 2:
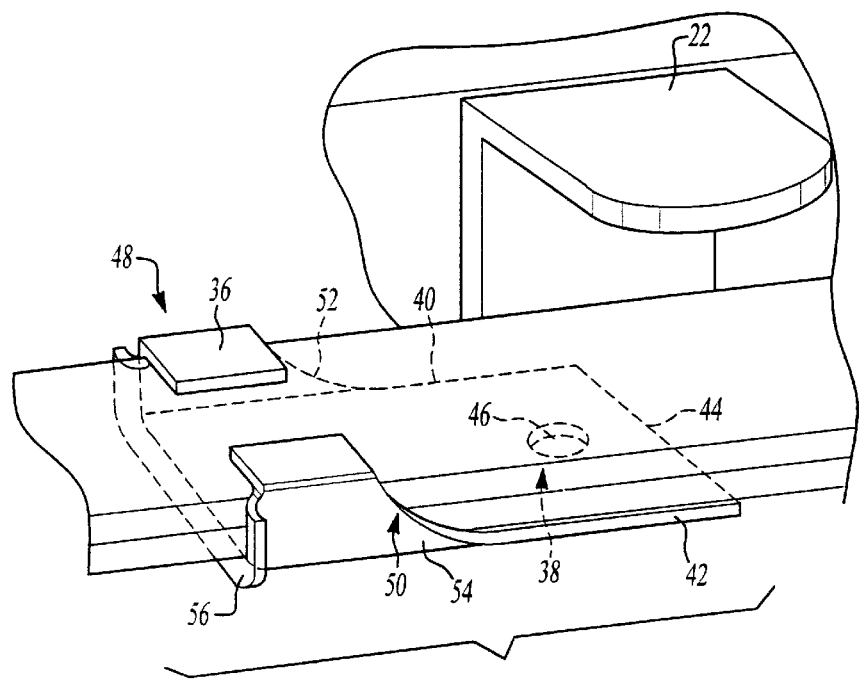
FIG. 2 is a partial exploded view of one of the spring systems of a preferred embodiment.
Figure 3:
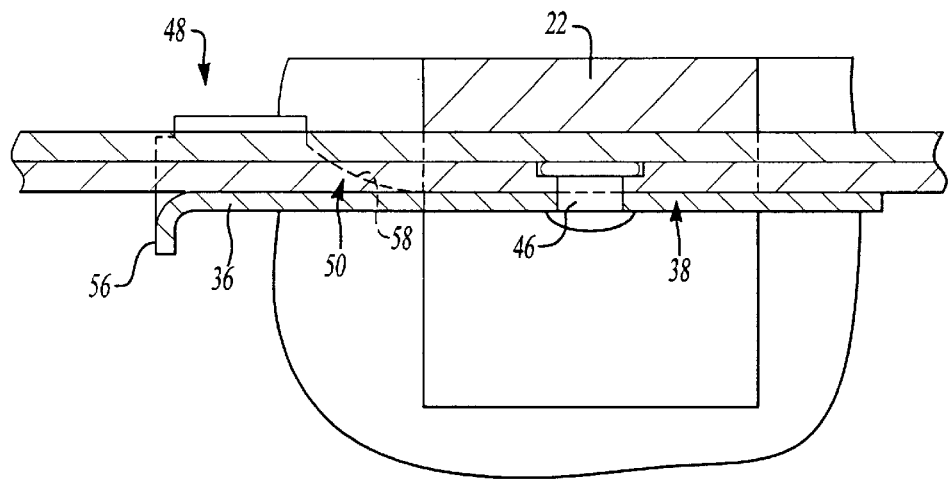
FIG. 3 is a cross sectional view (taken through FIG. 1) of a splay reduction device according to the present invention.

In one embodiment, the first leaf spring assembly 12 is mounted in two locations along its length (i.e. at its ends) by way of mounting brackets 18. The auxiliary leaf spring assembly, as illustrated in FIG. 1, is generally centrally mounted thereby creating at least one but preferably two free ends capable of deflecting about the mounting axis of the auxiliary assembly 14. As shown in FIGS. 1–3, spring stop members 20 and 22 having projecting tongues are mounted to the vehicle frame forming reaction surfaces for the auxiliary springs.

Also shown as part of the assembly of FIG. 1 is a generally transversely mounted axle 24, which may be operatively connected with a vehicle drive train (not shown). The axle has a rotor 26 at a free end for receiving and driving a wheel and tire assembly (also not shown). A brake system 28 (drum, disk or otherwise) is also associated with the axle. The axle 24 is connected to the leaf spring assemblies using a suitable mounting assembly, such as the assembly 30, which has a bottom plate 32, optional separation member or bushing, and upwardly extending mounting bars 34, which secure the axle 24 to at least one and preferably both leaf spring assemblies.

As shown in FIGS. 1–3, a splay reduction device 36 substantially encircles the leaf members of the second leaf spring assembly, toward the free end of the assembly, for reducing the potential for splay of the individual leaf members of the second leaf spring assembly in response to an applied load.

Figure 4:
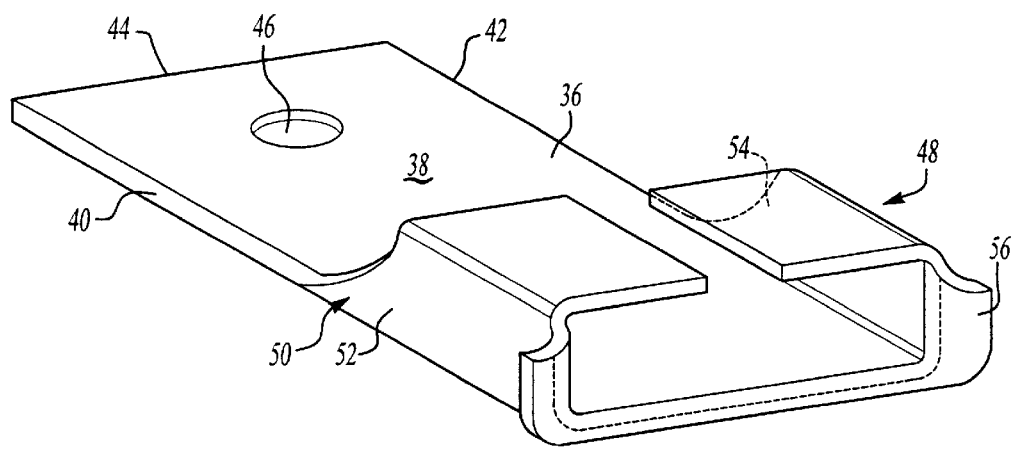
FIG. 4 is a perspective of another preferred embodiment of a splay reduction device.

Referring now to FIGS. 2–4, there is shown in enlarged detail one embodiment of the splay reduction device 36 of the present invention. In general, the device 36 includes a first portion 38 (which may be generally planar or substantially conformable to the topology of an adjacent leaf member) having a first side 40, a second side 42 and an end portion 44 that may be riveted (or otherwise mounted, such as through recessed fasteners) to one of said leaf members using mounting hole 46. The device also includes a second portion 48, which preferably is configured for receiving and substantially surrounding the leaf members, and securing them rigidly in place. The second portion 48 may completely surround the leaf members or partially surround them, as shown in the drawings. With the clip-mounting hole 46 (and fasteners) being located about the spring stop member 22 and the clasping feature of the second portion 48 adjacent to the spring stop member, a low spring stress can be maintained as one skilled in the arts would appreciate.

Figure 7:
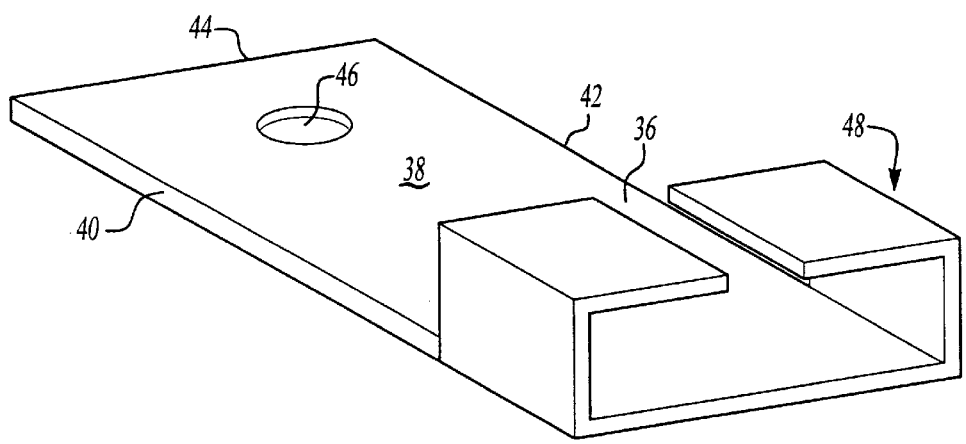
FIG. 7 is a perspective of another preferred embodiment of the splay reduction device.
Figure 8:
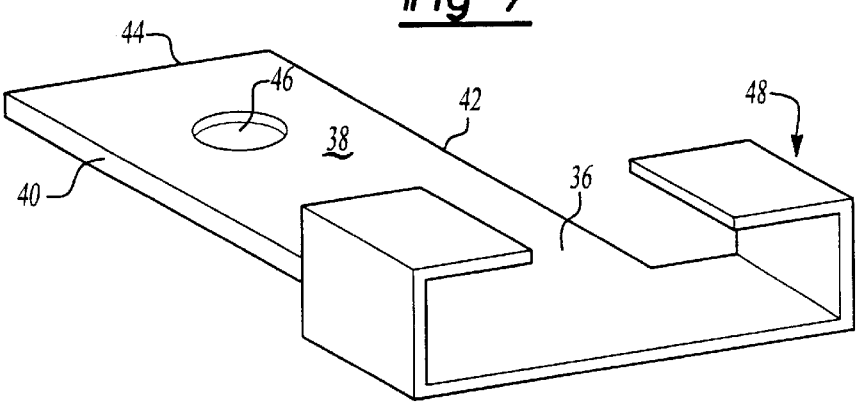
FIG. 8 is a perspective of an alternate preferred embodiment of the splay reduction device.

In a particularly preferred embodiment, the device 36 optionally includes a third portion 50 that is intermediate of the first portion 38 and second portion 48. FIG. 7 and FIG. 8 illustrate two alternate embodiments (36 "and 36 '", respectively) of the present invention where the third portion 50 is omitted. Additionally, FIG. 8 demonstrates a reduced amount of material an anti-splay clip may require under certain circumstances. Though other geometries are possible, the third portion 50 includes a first wall 52 connected to and projecting away from the first side 40 of said first portion 38 and a second wall 54 connected to and projecting away from the second side 42 of the first portion 38, preferably with both of the walls being tapered from the second portion 48 to the first portion 38 for imparting additional strength and rigidity. Though the walls may be separately constructed, in the embodiment shown they are integrally formed with the first and second portions.

Figure 5:
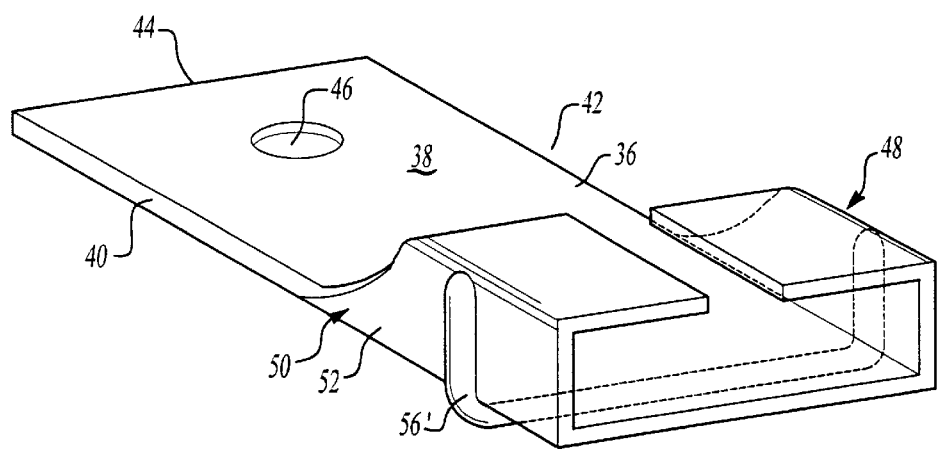
FIG. 5 is a perspective of yet another preferred embodiment of a splay reduction device.

In a particularly preferred embodiment, an optional flange 56 for imparting rigidity is formed or otherwise incorporated into the device, preferably near the end of the device that has the second portion. FIG. 5 illustrates an alternative location for the flange (shown as flange 56'), inboard of the end of the device 36'.

Figure 6:
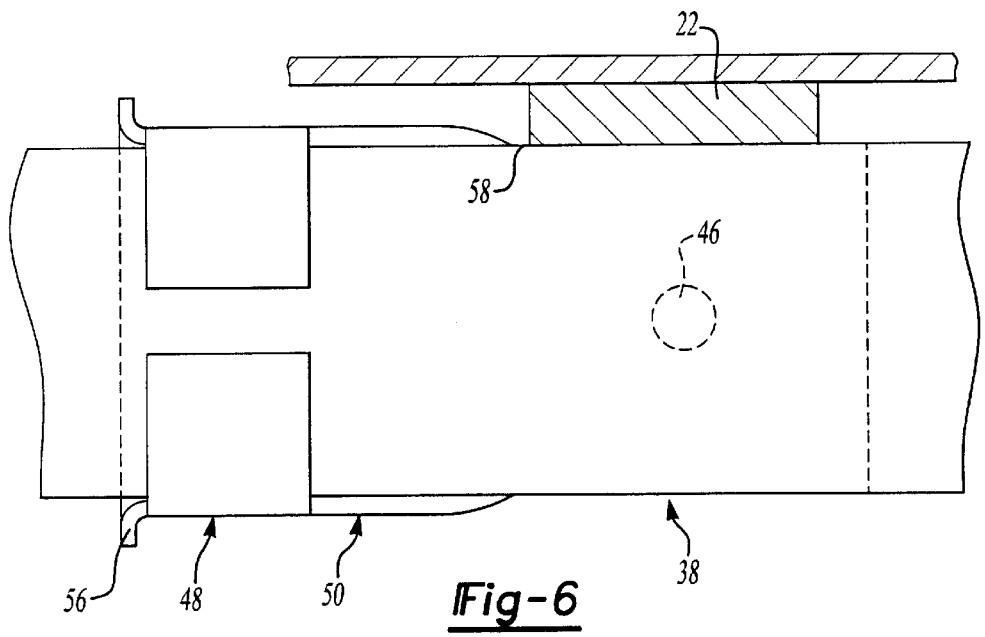
FIG. 6 is a partially broken away top view of one preferred embodiment of a splay reduction device installed in an assembly.

In FIG. 6 there is shown a transition point 58, which in an integrally formed device corresponds generally to the end point of the tapered side walls. As can be seen, in one embodiment, the spring stop member 22 is juxtaposed so that the transition point and the tapered walls avoid interference with the stop member 22.

It will be appreciated from the above that the needs in the art are met by the devices and assemblies of the present invention. Thus, coaxial alignment of the members of the second leaf spring assembly can be preserved while maintaining moderate stress levels in the surrounding area and avoiding interference between the splay reduction device and the spring stop member 22. As the skilled artisan will appreciate, during vehicle operation the first leaf spring is in dynamic vertical motion due to the vibrational load being transmitted from the wheel and tire assembly. If a threshold load is applied, the first leaf spring assembly 12 will reach its permitted amount of deflection, necessitating operation of the second leaf spring assembly 14 for absorbing the load. The spring stop members 20 and 22 in turn impedes further deflection of the second leaf spring assembly upon coming into contact with it. Particularly under the latter conditions, the splay reduction device of the present invention will help preserve alignment of the leaf members during rebound.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A device for reducing splay of leaves in an auxiliary automotive vehicle leaf spring assembly comprising:
   a) a first generally planar portion adapted for engaging, at an intermediate location along the length of an auxiliary leaf spring having a free end, a bottom surface of said leaf spring, said first generally planar portion having a first side, a second side, a first end, and a second free end;
   b) a second portion extending upwardly from said first generally planar portion for receiving and substantially surrounding all of a plurality of resilient stacked leaf members in said auxiliary leaf spring, said second portion having opposing spaced apart tabs, located adjacent only said first end of said first generally planar portion, for engaging and clasping a top surface of said auxiliary leaf spring, while maintaining said second free end of said first generally planar portion adjacent said bottom surface of said leaf spring; and
   c) a flange disposed on an end of at least said first portion wherein said flange projects at least downwardly from said first end of said first portion.

2. The device of claim 1 further comprising a third portion intermediate said first and second portions, said third portion including a first wall integrally formed with said second portion, said first wall projecting away from said first side of said first portion.

3. The device of claim 2, wherein said first wall is connected to said first portion at said first side of said first portion.

4. The device of claim 3, further comprising a second wall projecting away from said second side of said first portion.

5. The device of claim 2, wherein said first wall connects said first and second portions and tapers from said first portion to said second portion.

6. The device of claim 3, wherein said second wall connects said first and second portions and tapers from said first portion to said second portion.

7. A device for reducing splay of leaves in an automotive vehicle leaf spring assembly consisting essentially of:
   a) a first generally planar portion, for engaging and supporting a bottom surface of a leaf spring, having a first side, a second side, a first end, and a second free end, said second free end adapted to mount to said bottom surface of a leaf spring and having a mounting hole defined therein that receives an attachment member for direct attachment of said device to at least one first leaf member of an auxiliary leaf spring assembly;
   b) a second portion extending upwardly from said first generally planar portion adjacent said first end and along only a portion of the length of said first generally planar portion for receiving and substantially surrounding a plurality of resilient stacked leaf members of said auxiliary leaf spring assembly, said second portion having spaced apart and generally opposing tabs for engaging and clasping a top surface of a second leaf member of said auxiliary leaf spring assembly;
   c) a third portion intermediate of said first and second portions, said third portion including a first wall integrally formed with said second portion, said first wall projecting upwardly away from said first side of said first portion, wherein said first wall of said splay reduction device connects said first and second portions and tapers from said first side of first portion to said second portion, and further wherein said second wall connects said first and second portions and tapers from said second side of said first portion to said second portion; and
   d) an outwardly projecting flange disposed at said first end of said first generally planar portion.

8. The assembly of claim 7, wherein said splay reduction device is located toward an end of said assembly.

9. An automotive vehicle, comprising:
   a) a longitudinal vehicle frame member;
   b) a transversely disposed axle;
   c) a spring assembly including a first leaf spring assembly secured at its ends to said longitudinal vehicle frame member and to said axle at an intermediate location therealong, and an auxiliary spring assembly secured to said longitudinal vehicle frame and to said axle, said auxiliary spring assembly including a plurality of resilient leaf members, each having a free end adapted for dynamic vertical movement about a mounting axis of said auxiliary leaf spring assembly, in longitudinally stacked relationship relative to each other;

d) a splay-reduction device substantially surrounding all of said leaf members for securing said leaf members in longitudinally stacked relationship relative to each other, said splay reduction device including:
   a. a first generally planar portion having a first side, a second side, a first end, and a second free end fixedly mounted to an underside of one of said leaf members;
   b. a second portion extending upwardly from said first planar portion along only a portion of the length of said first generally planar portion for receiving and partially surrounding said leaf members, said second portion having spaced apart tabs for engaging and clasping a top surface of a top leaf spring of said auxiliary spring assembly; and
   c. a third portion intermediate of said first and second portions, said third portion including a first tapered wall connected to and projecting upwardly away from said first side of said first portion and a second tapered wall connected to and projecting upwardly away from said second side of said first portion, said tapered walls tapering from said second portion to said first portion; and e) a spring stop member having a projecting tongue and being mounted to said vehicle frame member, wherein said tongue of said spring stop member prevents said auxiliary spring assembly from deflecting beyond said spring stop member and wherein said splay reduction device is located along said auxiliary spring assembly to prevent said tabs of said second portion from engaging said spring stop member upon deflection of said auxiliary spring assembly.

10. The automotive vehicle of claim 9, further comprising a rotor disposed at an end of said axle for receiving a wheel and tire assembly.

11. The automotive vehicle of claim 9, further comprising a brake system associated with said rotor.

12. The automotive vehicle of claim 9, wherein said splay reduction device further includes a radial outwardly projecting flange on said second portion.

* * * * *